April 8, 1952     C. L. PETERSON     2,591,720
ROTARY LEAF FILTER UNIT
Filed Dec. 26, 1947     2 SHEETS—SHEET 1
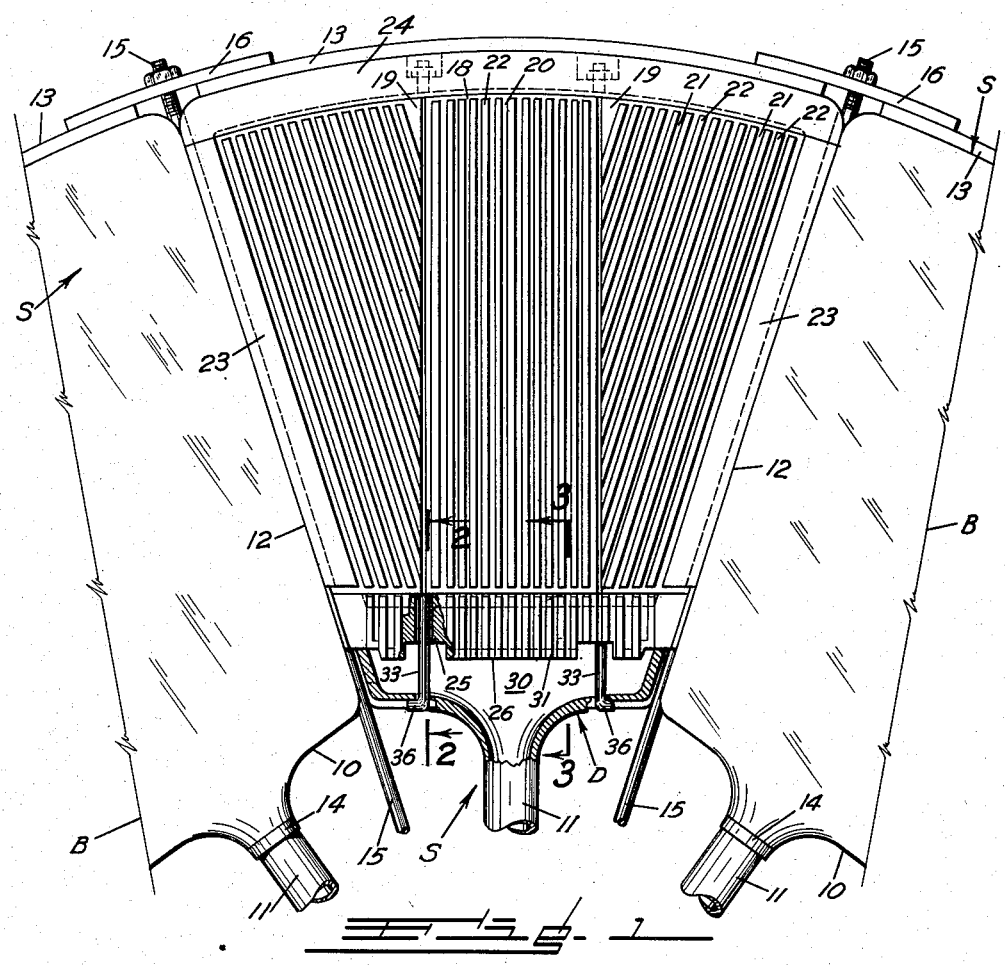
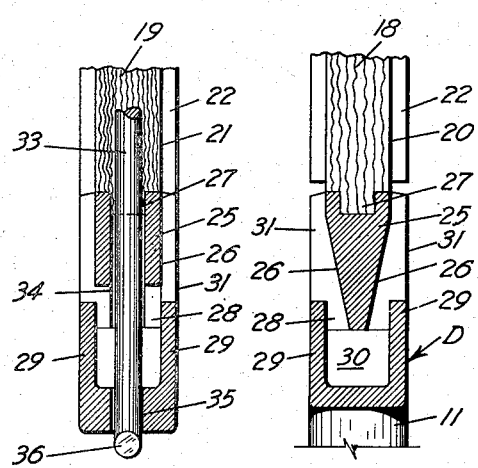
INVENTOR.
C. Lynn Peterson
BY
ATTORNEY

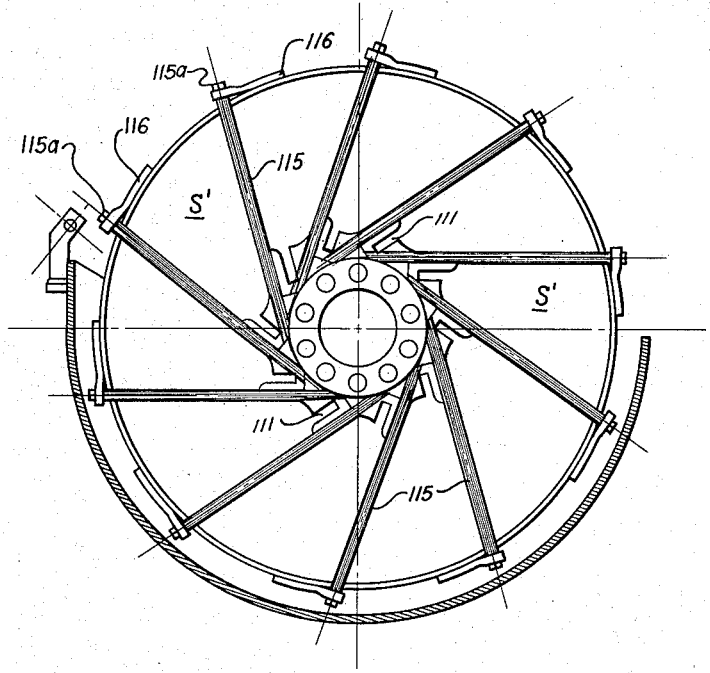
FIG.— 4
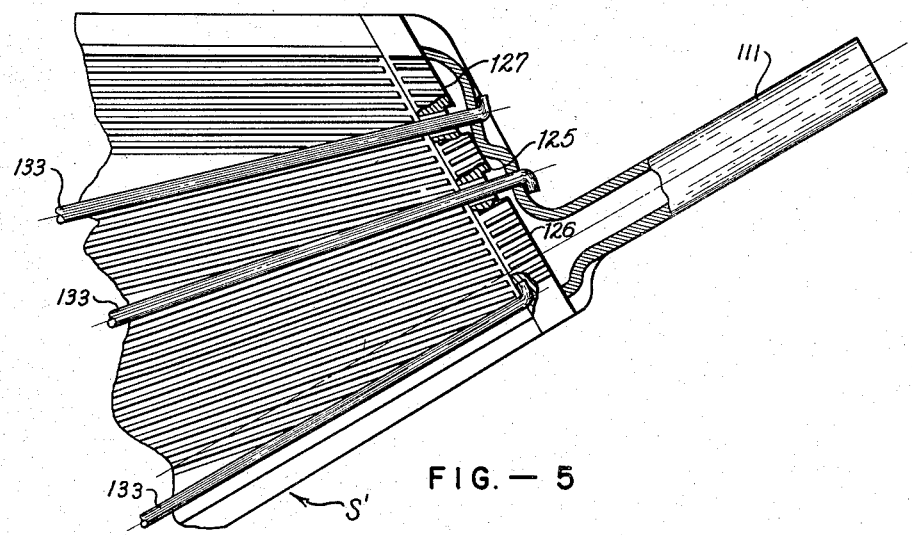
FIG.— 5
INVENTOR.
C. Lynn Peterson
ATTORNEY

Patented Apr. 8, 1952

2,591,720

UNITED STATES PATENT OFFICE 2,591,720

ROTARY LEAF FILTER UNIT

C. Lynn Peterson, Salt Lake City, Utah, assignor to Peterson Filters and Engineering Co., Salt Lake City, Utah, a partnership Application December 26, 1947, Serial No. 793,877

4 Claims. (Cl. 210—195)

This invention relates to rotary leaf filters, and more particularly to a leaf filter sector and a support for the filter cloth.

In rotary leaf filters, one or more circular leaves or discs are mounted on a horizontal shaft for rotation of successive portions thereof into and then out of a body of fluent matter or pulp, such as a liquid carrying solid particles, maintained at a predetermined level in a tank. In order to remove the liquid or filtrate and cause the solids to be deposited upon the leaf or disc, a suction effect is produced within the interior of the leaf, each leaf preferably being divided into a plurality of sectors, which may be "pie" shaped, i. e., having radial edges, or may be trapezoidal in shape, i. e., having edges inclined rearwardly from a radius. Also, each sector is usually provided with a cloth or bag which provides a filtering surface on both sides thereof.

The pulp level may be maintained at or about the center of the shaft, but it is often desirable to maintain the pulp level below this point, such as at a position corresponding to the inner edges of the sectors, when in lowermost position. As each sector, in turn, enters the pulp, a suction effect is produced in the interior of the sector, to draw filtrate through the cloth. The suction effect or vacuum may be controlled by a suitable valve, and transmitted to the respective sectors by passages in the shaft, or by piping within a hollow shaft.

As each sector moves through the pulp, the liquid or filtrate is drawn through the cloth by the vacuum, while the solid particles are deposited on the cloth. As soon as the respective sector begins to emerge from the pulp, the vacuum is turned off and, if desired, wash water or similar liquid sprayed onto the cake of solid particles, to displace any filtrate remaining therein. On the descending side, but before the sector has again reached the pulp level, a scraper may be mounted to remove the cake of solid particles, which are collected in a trough or the like and removed to a point of discharge or to a point of further treatment. In association with the scraper, or in lieu thereof, air or steam under pressure may be supplied through the interior of a sector, to dislodge or blow the cake off the cloth.

Normally, each sector is provided with a cloth or bag which is clamped or attached around the edges to the sector and is supported on the inside by a block of wood or similar material, having grooves therein adapted to permit the ready flow of filtrate to a discharge connection, which is connected at the shaft with the vacuum or discharge passages in the shaft. When handling relatively fast filtering products such as fine coal, the velocity of the filtrate is often sufficiently high at the drainage connection to wear away the wood by erosion. This reduces the cloth support area, and tends to interfere with proper drainage and the proper operation of the filter. Also, when utilizing a relatively heavy steam blow, the steam has a tendency to accelerate greatly the softening and deterioration of the wood supporting blocks. Due to the clamping pressure on these blocks, necessary to maintain them and/or the filter cloth in correct position, the wood tends to crush and splinter. Such crushing and splintering not only causes the drainage grooves to be blocked, but in some cases the splinters tend to rupture the cloth, thereby reducing the useful life of the latter.

Among the objects of this invention are to provide an improved sector for a rotary leaf filter or the like; to provide an improved filter cloth support for a rotary filter or the like; to provide such a sector and support which overcomes the difficulties incident to the tendency for erosion of the support; to provide such a sector and support which overcomes the tendency for the support to deteriorate or break down, particularly adjacent the drainage connection; to provide such a sector which includes a support adapted to be installed in connection with existing types of drainage connections; to provide such a sector and support by which sufficient clamping pressure may be exerted to insure maintenance in position, but wherein the possibility of damage to the support is avoided; and to provide such a sector and support which avoids difficulties in construction and is simple and easy to install.

Other objects and the novel features of this invention will become apparent from the description which follows, taken in connection with the accompanying drawing, in which:

Fig. 1 is a side elevation of a portion of a rotary filter leaf, with the cloth of one sector being broken away to show the interior construction;

Fig. 2 is a radial longitudinal section taken along line 2—2 of Fig. 1; and

Fig. 3 is a radial longitudinal section taken along line 3—3 of Fig. 1.

Fig. 4 is an elevational view illustrating the adaptation of the invention to trapezoidal sectors; and Fig. 5 is an enlarged side elevation of one of the sectors of Fig. 4.

A leaf filter sector S, as illustrated in Fig. 1, may extend over a radial portion of the leaf or disc, each sector S being provided with filter cloth, preferably formed as a bag B which is attached at its inner end to a drainage connection D, also termed a drainage bell, the cloth being supported from within in a manner described in detail later. The cloth bag B may be sewn along its inner edge, except for the opening provided for a pipe 11, of drainage connection D; and the bag B may also be sewn along one or both side edges 12, the outer end of the bag being open, but the edges thereof being clamped by a bar 13 against the bag support, which thereby causes the bag to be sealed. The inner end of the bag may be sealed to pipe 11 by a wire 14 or similar clamping means. Each pipe 11 extends to the central shaft on which the sectors are mounted, there connecting with the vacuum and pressure passages in the shaft in the usual manner. Also, rods 15, mounted to extend radially from the shaft, are disposed between the edges of adjacent sectors S, as shown, and are provided with clamps 16, which press bar 13 inwardly to clamp the outer edges of the bag B. As will be evident, a sector may be installed or replaced as a unit merely by removing the clamps 16 therefor, removing the sector to be replaced, installing a new bag in case the cloth has become unduly worn, and inserting between the rods 15 the repaired sector, or a different sector having a new cloth thereon. Then, the clamps 16 are replaced and tightened against the bar 13.

As described previously, the sector leaf is rotated into the pulp in a conventional manner and a suction effect is produced within its interior, through the drainage connection D. To prevent the cloth from collapsing, and also to provide for adequate removal of the filtrate, the supporting blocks for the cloth are provided with a plurality of generally radially extending grooves, which permit the filtrate to flow to the drainage connection D, for removal from the filter, and also permit the ready transmission of air or steam under pressure to all points of the bag.

In accordance with the present invention, one or more outer supporting blocks, such as blocks 18 and 19, are provided with grooves 20 and 21, respectively, on both sides thereof, the lands or ribs 22 between the grooves supporting a major portion of the cloth. Block 18 is disposed centrally of the sector, being generally rectangular in shape, and grooves 20 thereof extend parallel to the central groove, which is a radial groove. The blocks 19 are mounted at each side of block 18, and are generally triangular or trapezoidal in shape, the grooves 21 thereof being parallel to a radial groove adjacent the side edge thereof. Thus, the grooves of blocks 19 extend toward the central block 18, thereby providing better drainage, since the filtrate flowing along the innermost grooves flows toward the center of the bag, rather than toward the sides or edges. More adequate support for the bag is also provided, since the edges of the bag ordinarily bind tightly against side bars 23 and an outer bar 24, the latter extending across the top or outer edge of the sector.

Each of the outer supporting blocks 18 and 19 may be formed of material such as wood, although such material is subject to erosion and deterioration, it is relatively cheaper and the grooves therein normally more readily produced.

Also in accordance with this invention, the inner portion of the cloth is supported by an inner block 25, which is provided with grooves 26, which may extend parallel to a central radial groove thereof, the outer ends of grooves 26 being substantially in alignment with the inner ends of grooves 20 and 21. The inner block 25 is formed of material, such as cast iron or cast steel, which is resistant to erosion and deterioration. As in Figs. 2 and 3, a tongue 27 may be provided at the lower end of each of blocks 18 and 19, and the outer edge of block 25 provided with a groove in which the tongues 27 fit. Also, block 25 is provided with a tongue 28 adapted to fit between flanges 29 of drainage connection D, which flanges form between them a space 30 for passage of filtrate to pipe 11, and also for transmission of vacuum and pressure effects to the interior of the sector. To provide a relatively free flow of liquid or filtrate into space 30, and also to permit effective transmission of pressure and vacuum effects to the interior of the sector, the grooves 26 of block 25 preferably taper inwardly at the bottom, to the end of tongue 28, so that the grooves 26 continue undiminished in dimension between flanges 29 to space 30. Ribs or lands 31, between grooves 26, extend to and rest on flanges 29.

The outer blocks 18 and 19, the inner block 25, and the drainage connection D may be clamped together to form a unit, by tie rods 33 which extend from outer bar 24 between blocks 18 and 19, suitable grooves preferably being formed along the edges of blocks 18 and 19 to accommodate the tie rods. The tie rods 33 also extend through holes 34 in inner block 25 and holes 35 in the drainage connection D, each rod 33 being provided with a hook 36 at its inner end, adapted to engage the underside of drainage connection D. The upper or outer end of each rod 33 may also clamp outer bar 24 against blocks 18 and 19, through nuts or the equivalent, threaded onto the outer ends of rods 33 and adapted to be received in countersinks or recesses in outer bar 24, as indicated in dotted lines in Fig. 1. Side bars 23 may, at the same time, be clamped between inner block 25 and outer bar 24, as shown.

In adapting the principles of this invention to trapezoidal sectors, see Figs. 4 and 5, the edges of which, instead of being radial, may be tangent to a circle having approximately a radius equal to the distance from the center of the shaft to the inner edge of the filter cloth, the inner block 125 may be similar to the inner block 25 shown, except that the holes, such as the holes 34 may be inclined, due to the inclination of the tie rods 115 to accommodate the shape of the sector S'. Also, some of the grooves 126 corresponding to grooves 26 may be parallel, as shown, but others 127 inclined thereto, as toward the longer edge of the sector. Also, the inclination of the grooves 21 of the blocks corresponding to the side supporting blocks 19, may vary in angularity from those shown for a "pie" sector. As in the sector illustrated herein, the inner block for a trapezoidal sector is made of material resistant to erosion and deterioration.

From the foregoing, it is apparent that the filter sector and sector cloth support of this invention fulfill to a marked degree the requirements and objects hereinbefore set forth. The inner block, formed of a material resistant to erosion, overcomes the difficulties attendant upon heavy steam blows, or the tendency for wood to splinter and block the filtrate passages or damage the filter cloth. Such an inner block also permits the remaining block or blocks, supporting the filter cloth, to be made of cheaper and lighter material, without increasing to an undesirably marked extent the cost or weight of the sector. In fact, the cost may actually be reduced because the taper of the bottom of the grooves 26 is relatively easily produced when the inner block 25 is made of cast iron, cast steel or equivalent material, whereas it is a relatively expensive operation to produce a tapered bottom at the lower end of each groove of a wooden block. Also, such a taper at the bottoms or lower ends of the grooves of a wooden block tends to weaken unduly the block, at the point of engagement with the drainage connection of bell D.

An additional cause of erosion, which the sector and cloth support of this invention overcomes, is the tendency for air to pass through the cloth, along a radial edge of the sector, in the event that the pulp level drops below normal, as the sector may then be only partly immersed in the pulp, with a portion thereof above the pulp level when the vacuum or suction is turned on. The air rushing into the interior of the sector tends to boil or move at high velocity through the liquid or filtrate, thus tending to cause additional erosion along the inner or lower end of the support, as of the grooves and ribs within and adjacent the drainage connection or sector bell D.

While a specific form of the present invention has been illustrated, and a variation thereof described, it will be understood that other variations may exist. Also, the invention may take different forms and other embodiments may be utilized, all without departing from the spirit and scope thereof.

What is claimed is:

1. In a support for a leaf filter sector including a bag of cloth or the like, a plurality of outer supporting blocks having generally radial grooves on each side thereof for supporting the outer radial portion of said cloth, each said outer block being formed of wood, said outer blocks including a central block having grooves parallel to a central radial groove thereof and blocks at each side of said central block each having grooves parallel to a radial groove adjacent the sector edge, said latter blocks tapering toward the inner ends; a supporting block formed of material resistant to erosion and deterioration for supporting the inner radial portion of said cloth, said inner block having radial grooves, the outer ends of which are substantially aligned with said outer block grooves and the bottoms of which taper so as to be deeper at the inner end of said block, said block also having a tongue at the inner end; and a drain connection adapted to receive said tongue.

2. A filter sector comprising a sector shaped bag of cloth or the like; a plurality of supporting blocks having generally radial grooves on each side thereof for supporting the outer radial portion of said cloth, each said outer block being formed of wood, said outer blocks including a central block having grooves parallel to a central radial groove thereof and blocks at each side of said central block each having grooves parallel to a radial groove adjacent the sector edge, said latter blocks tapering toward the inner ends; a bar extending across the outer ends of said outer blocks; a supporting block formed of material resistant to erosion and deterioration for supporting the inner radial portion of said cloth, said inner block having radial grooves, the outer ends of which are substantially aligned with said outer block grooves and the bottoms of which taper so as to be deeper at the inner end of said block, said block also having a tongue at the inner end; a drain connection having side flanges adapted to receive said tongue and also provide a space for transmission of pressure and vacuum effects, said drain connection also including a pipe extending radially inwardly and said bag being adapted to enclose said supporting blocks and the flanges of said drain connection; means for clamping said drain connection and supporting blocks together, including radial rods extending between said flanges of said drain connection and also through said supporting blocks, and adapted to be attached to said outer bar and to said drain connection; and means for clamping the outer edges of said bag against said outer bar, the inner end of said bag having a neck adapted to be sealed to said drain connection pipe.

3. A filter cloth support for a leaf filter sector comprising a drain chamber to provide a space for transmission of pressure and vacuum effects to said sector, a metallic supporting block seated upon said chamber and having filtering passages extending into said chamber wherein the filtered medium and steam has great velocity in said filter, a filter bag supporting block of wood seated upon said metallic block with passages aligned with aforesaid passages, a filter bag overlying the sides of all of said blocks and chamber, and means common to said blocks and chamber for securing the same together as a unit.

4. A filter sector as defined in claim 3, wherein said means comprises bolts having ends hooked into said drain chamber and extending through said metallic and bag supporting blocks to fasten them together as a unit.

C. LYNN PETERSON.

REFERENCES CITED

The following references are of record in the file of this patent:

UNITED STATES PATENTS

| Number | Name | Date |
|---|---|---|
| 1,036,174 | Barnes | Aug. 20, 1912 |
| 1,685,085 | Hoyt | Sept. 25, 1928 |
| 2,351,652 | Anderson | June 20, 1944 |
| 2,338,549 | Shriver et al. | Jan. 4, 1944 |
| 2,464,223 | Genter | Mar. 15, 1949 |

FOREIGN PATENTS

| Number | Country | Date |
|---|---|---|
| 176,495 | Great Britain | Mar. 7, 1922 |